UNITED STATES PATENT OFFICE.

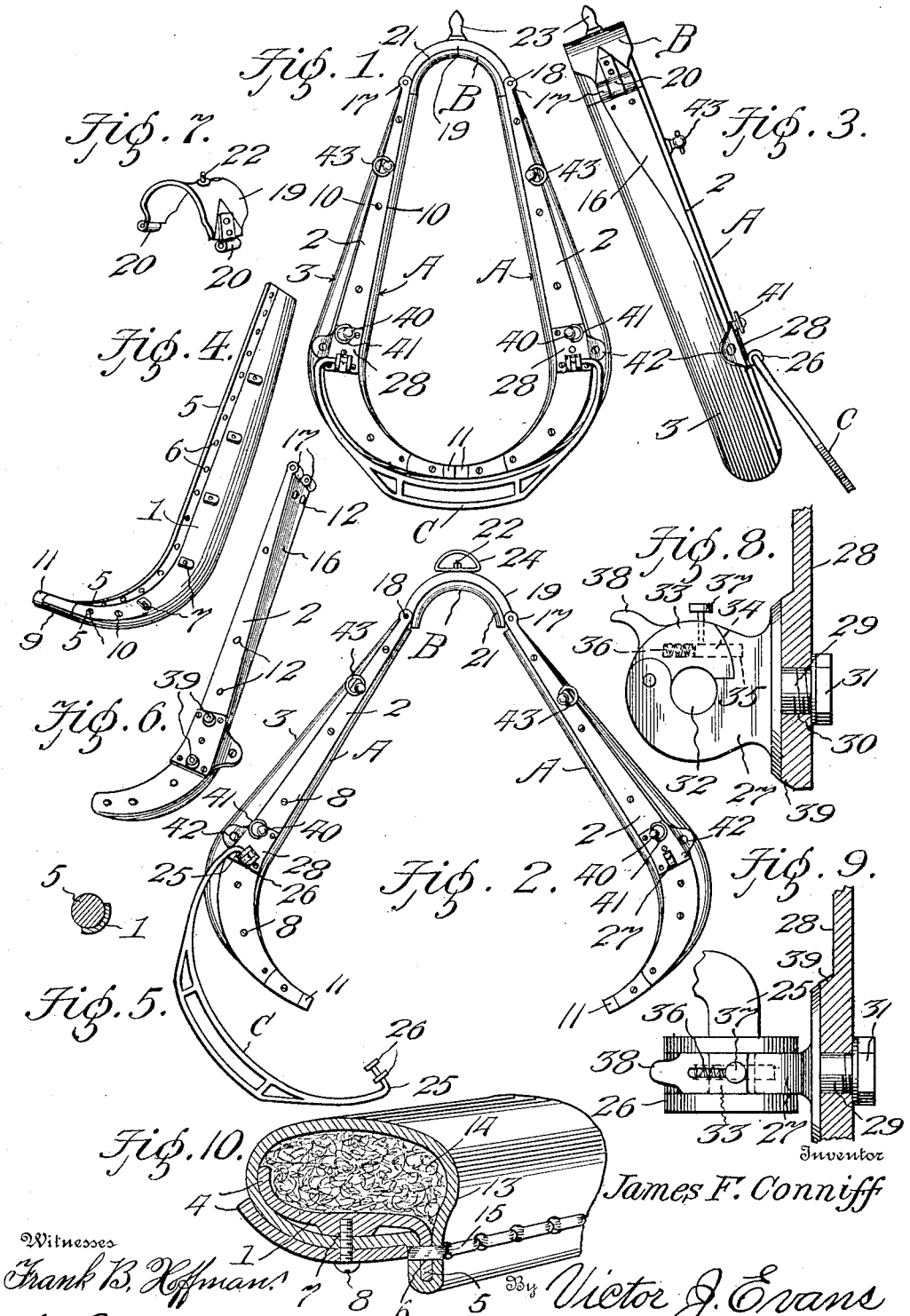

JAMES F. CONNIFF, OF TRUMANN, ARKANSAS.

HORSE-COLLAR.

No. 888,388.  Specification of Letters Patent.  Patented May 19, 1908.

Application filed March 26, 1907. Serial No. 364,700.

*To all whom it may concern:*

Be it known that I, JAMES F. CONNIFF, a citizen of the United States, residing at Trumann, in the county of Poinsett and State of Arkansas, have invented new and useful Improvements in Horse-Collars, of which the following is a specification.

This invention relates to a horse collar of that type in which the shoulder sections are hingedly connected to the neck piece so as to permit the collar to adjust itself to the shoulder and neck of the horse without causing rubbing or chafing at any particular part as the strain of the collar under the load drawn by the horse is uniformly distributed.

The invention has for one of its objects to improve and simplify the construction and operation of devices of this character so as to be comparatively substantial and of durable form, easy and inexpensive to manufacture and readily adjusted to the horse.

A further object of the invention is to provide a horse collar having its shoulder sections composed of pressed steel members to which the padding is applied and equipped with a breast yoke which serves to hold the collar closed and for attachment with the tongue of the vehicle.

A still further object is the provision of a horse collar having simple means for detachably connecting the breast yoke with the shoulder section and also having means on the neck piece, to which the shoulder sections are hinged, for attaching any suitable ornament, advertising plate or other fitting.

With these objects in view and others, as will appear as the description proceeds, the invention comprises the various novel features of construction and arrangement of parts which will be more fully described hereinafter and set forth with particularity in the claims appended hereto.

In the accompanying drawing which illustrates one of the embodiments of the invention:—Figure 1 is a front view of the horse collar closed. Fig. 2 is a similar view showing the collar open. Fig. 3 is a side view of the horse collar. Fig. 4 is a perspective view of the inner pressed steel member of one of the side or shoulder sections of the collar. Fig. 5 is a transverse section on line 5—5, Fig. 4. Fig. 6 is a perspective view of the outer pressed steel member. Fig. 7 is a perspective view of the neck piece. Fig. 8 is a side view of the swiveled stud or bearing on each shoulder section for receiving the breast yoke. Fig. 9 is a plan view of the said stud. Fig. 10 is a transverse sectional view on line 10—10 of Fig. 1.

Similar reference characters are employed to designate similar parts throughout the figures.

Referring to the drawing, A designates the side or shoulder sections of the collar, B the neck piece, and C the breast yoke. Each side or shoulder section A is composed of two pressed steel members 1 and 2 on which the usual padding 3 of the collar is supported. The members 1 and 2 are straight throughout the major portions thereof and curved laterally at their lower ends and serve to give the proper shape to the collar. In transverse section, the members curve rearwardly at their outer edges as indicated at 4, Fig. 10. The inner member 1 has a forwardly extending longitudinal rib 5 which is provided with a plurality of spaced thread-receiving apertures 6 and on the front surface of this member are spaced bosses 7 that are bored and tapped for receiving bolts or screws 8, whereby the members 1 and 2 are secured together. On the curved ends of the member 1 are wooden tip pieces 9, as shown in Fig. 4, which are disposed under the members and secured thereto by screws 10. These tip pieces 9 are fitted with ferrules 11 that abut when the collar is closed, as shown in Fig. 1. The outer member 2 is provided with spaced apertures 12 for receiving the screws or bolts 8. The padding 3 extends substantially the full length of the sections A and the leather 13 of the padding is arranged entirely around the inner member 1, with hair 14 or other cushioning material filled in between the back of the member 1 and body of the leather 13, as clearly shown in Fig. 10. The leather is secured to the member 1 by sewing the same thereto, the thread being passed through the leather and apertures 6 of the rib 5, as clearly indicated at 15 in Fig. 10. The front member 2 is then fitted to the leather covered member 1 and firmly secured thereto by the screws 8. The top ends of the outer members 2 are formed with flanges 16 having eyes 17 for receiving the pintles 18 that hingedly connect the sections A with the neck piece B.

The neck piece B comprises a suitably shaped metal body 19 preferably curved to fit the neck of the horse and having secured to its ends eyes 20 as clearly shown in Fig. 7, that are adapted to extend between the eyes 17 of the members 2 for receiving the pintles 18. On the metal body 19 is secured any suitable padding 21 for preventing rubbing or chafing and the body is provided with an upwardly extending bolt 22 that is adapted to receive an ornament 23 of any suitable character, as shown in Figs. 1 and 3, a plate 24 for receiving advertising matter or the name, residence and occupation of the owner, or any other suitable device according to the taste of the user.

The yoke C is preferably a semi-elliptical metal structure having inwardly turned pintles or pivots 25 on which are spaced shoulders 26. The breast yoke is detachably connected with the members A by studs or bearings 27. These studs or bearings are swiveled on plates 28 bolted or otherwise suitably secured to the front members 2, each stud 27 having its threaded shank 29 extending through an opening 30 in the plate and provided with a nut 31 for holding the stud in place. The head of the stud has a transverse aperture 32 that is open to one side and closed by a hinged keeper 33. This keeper is locked closed by a bolt 34 mounted therein and adapted to enter a recess 35 in the head of the stud. The bolt is held in locked position by a spring 36 and is actuated by a finger piece 37 for withdrawing the bolt. Adjacent the finger piece is a finger piece 38 on the keeper 33 whereby the finger pieces can be gripped between the first finger and thumb and pressed when it is desired to unlock the keeper. The head of the stud has two flat parallel sides that engage between the collars or shoulders 26 on the pintles of the yoke. The plates 28 are provided with bosses 39, as shown in Figs. 6 and 9 for receiving the studs and also for receiving the studs 40 having rings 41. Each plate 28 has a lateral extension 42 that is apertured for receiving the tug of the harness. Suitably arranged on the front members 2 of the section A are rings 43 through which the reins of the harness pass.

From the foregoing description taken in connection with the accompanying drawings, the advantages of the construction and of the method of operation will be readily understood by those skilled in the art to which the invention appertains.

In practice, the parts of the collar are in the position shown in Fig. 2, when the collar is to be adjusted to the horse. The collar is placed over the neck of the horse from above and the sections A brought together in place on the horse's shoulders. The hanging breast yoke is then swung upwardly so that its free end can be attached to the swiveled stud or bearing 27. In order to attach the free end of the yoke, the pintle 25 thereof is brought to a position above the stud, while the keeper thereof is in open position and then by a downward movement, the portion of the pintle between the collars 26 is entered in the opening 33 of the stud with the said collars engaging the flat side of the head of the stud. The keeper 33 is then moved to closed position and locked by the bolt 34. As shown in Fig. 1, the pintles 25 are disposed in a horizontal plane when the collar is closed so that the yoke C is free to swing back and forth with the movement of the horse. Either end of the breast yoke can be detached, and since the studs 27 are swiveled, the breast yoke can assume a hanging position when the collar is open. This yoke takes the place of the usual breast chains or straps and serves to connect the collar with the tongue of the vehicle.

I have described the principle of operation of the invention, together with the apparatus which I now consider to be the best embodiment thereof, but I desire to have it understood that the apparatus shown is merely illustrative and that such changes may be made when desired, as are within the scope of the claims.

What is claimed, is:—

1. A horse collar comprising a pair of side sections flexibly connected at their upper ends, apertured members on the sections, a swinging breast yoke having pintles on its ends, and means on the side sections for detachably connecting the pintles thereto, each means comprising a stud rotatable in the aperture of the member of its respective side section, a hinged keeper on the stud for holding the pintle on the latter, and a lock bolt mounted on the keeper for holding the latter in locked position.

2. A horse collar comprising side sections, a neck piece hingedly connected to the sections, a breast yoke having inturned pintles, swiveled devices on the sections, and means for hingedly and detachably connecting the pintles of the yoke with the devices.

3. A horse collar comprising side sections, a breast yoke, and means for attaching the yoke to the sections, each means comprising a stud swiveled on its respective section and provided with a pintle-receiving opening, a pintle on the yoke engaged in the opening, a keeper on the stud for permitting turning of the pintle in the opening, and a lock bolt for holding the keeper in place.

4. In a horse collar, a breast yoke having its ends bent inwardly and disposed in a common line, spaced shoulders on the said ends, devices engaging between the shoulders, and means on the devices for holding the breast yoke removably in position.

5. In a horse collar, the combination of a breast yoke having pintles at its ends arranged in alinement, spaced shoulders on each pintle, a swiveled device for receiving each pintle and arranged to coöperate with the shoulders thereof to prevent longitudinal movement of the pintle, a hinged keeper on each device, and a spring-pressed lock bolt on each keeper.

6. In a horse collar, the combination of a pair of side sections, each section being composed of an inside metal member having a longitudinal perforated rib along one edge thereof, a padding cover extending over the member and rib thereof, means extending through the cover and perforations of the rib for connecting the cover with the member, an outer metal member having one edge presented to the rib and secured against the portion of the cover disposed over the inner member, and a cushioning material within the cover.

In testimony whereof, I affix my signature in presence of two witnesses.

JAMES F. CONNIFF.

Witnesses:
 JOHN L. FLETCHER,
 CHATTIN BRADWAY.